United States Patent
Hoehn et al.

(10) Patent No.: US 8,574,425 B2
(45) Date of Patent: Nov. 5, 2013

(54) PROCESS FOR REMOVING HEAVY POLYNUCLEAR AROMATIC COMPOUNDS FROM A HYDROPROCESSED STREAM

(75) Inventors: Richard K. Hoehn, Mount Prospect, IL (US); Daniel J. Breitenfeldt, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 385 days.

(21) Appl. No.: 12/967,773

(22) Filed: Dec. 14, 2010

(65) Prior Publication Data

US 2012/0145594 A1 Jun. 14, 2012

(51) Int. Cl.
*C10G 9/14* (2006.01)
(52) U.S. Cl.
USPC ............... 208/82; 208/58; 208/107; 208/100
(58) Field of Classification Search
USPC ............................. 208/100; 282/82; 196/111
See application file for complete search history.

(56) References Cited

U.S. PATENT DOCUMENTS

| | | |
|---|---|---|
| 3,130,006 A | 4/1964 | Rabo et al. |
| 3,314,879 A * | 4/1967 | Lacy et al. ............ 208/356 |
| 3,933,620 A | 1/1976 | Russum et al. |
| 4,363,718 A | 12/1982 | Klotz |
| 4,456,525 A | 6/1984 | Spars et al. |
| 5,120,427 A | 6/1992 | Stine |
| 5,230,217 A | 7/1993 | Agrawal |
| 5,849,979 A | 12/1998 | Kalnes |
| 6,361,683 B1 | 3/2002 | Kalnes |
| 6,379,532 B1 | 4/2002 | Hoehn |
| 6,379,535 B1 | 4/2002 | Hoehn |
| 6,858,128 B1 | 2/2005 | Hoehn |
| 7,622,034 B1 | 11/2009 | Thakkar et al. |
| 2008/0161618 A1 * | 7/2008 | Zimmermann et al. ...... 585/324 |

OTHER PUBLICATIONS

Latif,"Polynuclear aromatic formation in hydrocracker and their impact on catalyst stability", Kuwait Institute for Scientific Research et al. "Catalysts in Petroleum Refining" Conference (Kuwait Mar. 5-8, 1989) Studies in Surface Science and Catalysis . . . Catalysts in Petroleum Refining 1989 V53 349-61 (1990).
U.S. Appl. No. 12/967,792, filed Dec. 14, 2010, Hoehn et al.

* cited by examiner

*Primary Examiner* — Randy Boyer
*Assistant Examiner* — Juan Valencia
(74) *Attorney, Agent, or Firm* — James C Paschall

(57) ABSTRACT

The present invention is an improved process for stripping HPNA's from hydroprocessed streams in a fractionation column having a split shell configuration. Only one vapor stripping feed is required to the split shell of the fractionation column. The resulting reduction in steam requirement provides a superior fractionation in the column.

20 Claims, 2 Drawing Sheets

US 8,574,425 B2

PROCESS FOR REMOVING HEAVY POLYNUCLEAR AROMATIC COMPOUNDS FROM A HYDROPROCESSED STREAM

BACKGROUND OF THE INVENTION

The field of art to which this invention pertains is the catalytic hydroprocessing of hydrocarbons to useful hydrocarbon products. More particularly, the invention relates to catalytic hydroprocessing and the recovery of useful hydrocarbon products such as diesel.

Petroleum refiners often produce desirable products such as turbine fuel, diesel fuel, middle distillates, and gasoline boiling hydrocarbons among others by hydroprocessing a hydrocarbon feedstock derived from crude oil or heavy fractions thereof. Hydroprocessing can include, for example, hydrocracking, hydrotreating, hydroisomerization, hydrodesulfurization and the like. Feedstocks subjected to hydroprocessing can be vacuum gas oils, heavy gas oils, and other hydrocarbon streams recovered from crude oil by distillation. For example, a typical heavy gas oil comprises a substantial portion of hydrocarbon components boiling above about 371° C. (700° F.) and usually at least about 50 percent by weight boiling above 371° C. (700° F.), and a typical vacuum gas oil normally has a boiling point range between about 315° C. (600° F.) and about 565° C. (1050° F.).

Hydroprocessing is a process that uses a hydrogen-containing gas with suitable catalyst(s) for a particular application. In many instances, hydroprocessing is generally accomplished by contacting the selected feedstock in a reaction vessel or zone with the suitable catalyst under conditions of elevated temperature and pressure in the presence of hydrogen.

Hydrocracking is a type of hydroprocessing that is generally accomplished by contacting in a hydrocracking reaction vessel or zones a gas oil or other feedstock to be treated with a suitable hydrocracking catalyst under conditions of elevated temperature and pressure in the presence of hydrogen so as to yield a product containing a distribution of hydrocarbon products desired by the refiner. The operating conditions and the hydrocracking catalysts within a hydrocracking reactor influence the yield of the hydrocracked products.

Hydroprocessing and most notably, hydrocracking, produce problematic compounds known as heavy polynuclear aromatics (HPNA's). Polynuclear aromatics (PNA) are compounds that have two or more aromatic rings. HPNA's typically refer to compounds with six or more aromatic rings and often refer to compounds with eleven or more aromatic rings. HPNA's can build up in a hydroprocessing recycle loop and accelerate catalyst deactivation.

U.S. Pat. No. 6,379,535 taught a catalytic hydrocracking process which uses a split-shell fractionator to recover lower boiling hydrocarbon product streams, a liquid recycle stream and a drag stream containing a high concentration of heavy polynuclear aromatic (HPNA) compounds. The split shell fractionator receives just one external product feed stream. A portion of the fractionator bottoms from one side of a split shell fractionator is fed to the other side of the split shell in which steam is used to strip lighter materials from the bottoms and leave a concentrated HPNA bottoms stream. U.S. Pat. No. 6,379,532 similarly taught a similar split shell arrangement to concentrate HPNA bottoms. However, two external product feed streams are fed to the split shell fractionator, a lighter product feed stream and a heavier product feed stream are both external feed streams fed to opposite sides of the split shell fractionator. The heavier feed stream derived from a separator upstream of the split shell fractionator is stripped to concentrate HPNA's in a liquid stream.

The amount of stripping steam required to strip lighter materials from the HPNA's in the split shell fractionation column is substantial. Combined with the substantial stripping steam requirements on the other side of the split shell fractionation column for stripping lighter materials from the main feed to the column, the stripping steam requirement is quite large. The steam requirements have implications for the size of the product fractionation column itself and for the overhead condenser system. Additionally, it is desirable for the fractionation column to provide specified product cuts efficiently.

BRIEF SUMMARY OF THE INVENTION

It is desired to reduce the total stripping vapor required for product fractionation column. More efficient recovery processes and apparatuses are sought to remove HPNA's from hydroprocessed products.

In accordance with a process embodiment, the present invention relates to a process for removing HPNA's from a hydroprocessed stream comprising feeding the hydroprocessed stream comprising HPNA's to a second compartment in a fractionation column also having a first compartment. A stripping vapor is fed to the second compartment to strip lighter hydrocarbons from the hydroprocessed stream and provide a stripped hydroprocessed stream and an enriched stripping vapor. The stripped hydroprocessed stream is withdrawn from the second compartment with a greater concentration of HPNA's than in the hydroprocessed stream fed to the second compartment. The enriched stripping vapor enriched with lighter hydrocarbons is withdrawn from the second compartment. Lastly, the enriched stripping vapor is passed to the first compartment in the fractionation column.

In accordance with another process embodiment, the present invention relates to a process for fractionating a hydroprocessed stream comprising feeding a first hydroprocessed stream to a fractionation column. Heavier portions of the first hydroprocessed stream are stripped in a first compartment of the fractionation column. A second hydroprocessed stream is fed to a second compartment of the fractionation column. A stripping vapor is fed to the second compartment to strip the second hydroprocessed stream of lighter hydrocarbons to provide a stripped hydroprocessed stream and an enriched stripping vapor stream. The stripped hydroprocessed stream is withdrawn from the second compartment with a greater concentration of HPNA's than in the second hydroprocessed stream fed to the second compartment. The enriched stripping vapor enriched with lighter hydrocarbons is withdrawn from the second compartment. Lastly, the enriched stripping vapor is passed to the first compartment for stripping lighter materials from heavier portions of the first hydroprocessed stream.

In accordance with a further process embodiment, the present invention relates to a process for hydroprocessing a hydrocarbon stream comprising contacting a hydrocarbon stream with hydrogen and hydroprocessing catalyst under hydroprocessing conditions to provide a hydroprocessed effluent. The hydroprocessed effluent is separated to provide a first hydroprocessed stream. The first hydroprocessed stream is fed to a fractionation column having a first compartment and a second compartment. A second hydroprocessed stream comprising HPNA's is fed to the second compartment. A stripping vapor is fed to the second compartment to strip lighter hydrocarbons from the second hydroprocessed stream and provide a stripped hydroprocessed stream and an enriched stripping vapor. The stripped hydroprocessed stream is withdrawn from the second compartment with a greater concentration of HPNA's than in the hydroprocessed stream fed to the second compartment. The enriched stripping vapor enriched with lighter hydrocarbons is withdrawn from the second compartment. Lastly, the enriched stripping vapor is passed to the first compartment in the fractionation column.

DEFINITIONS

Figure 1:
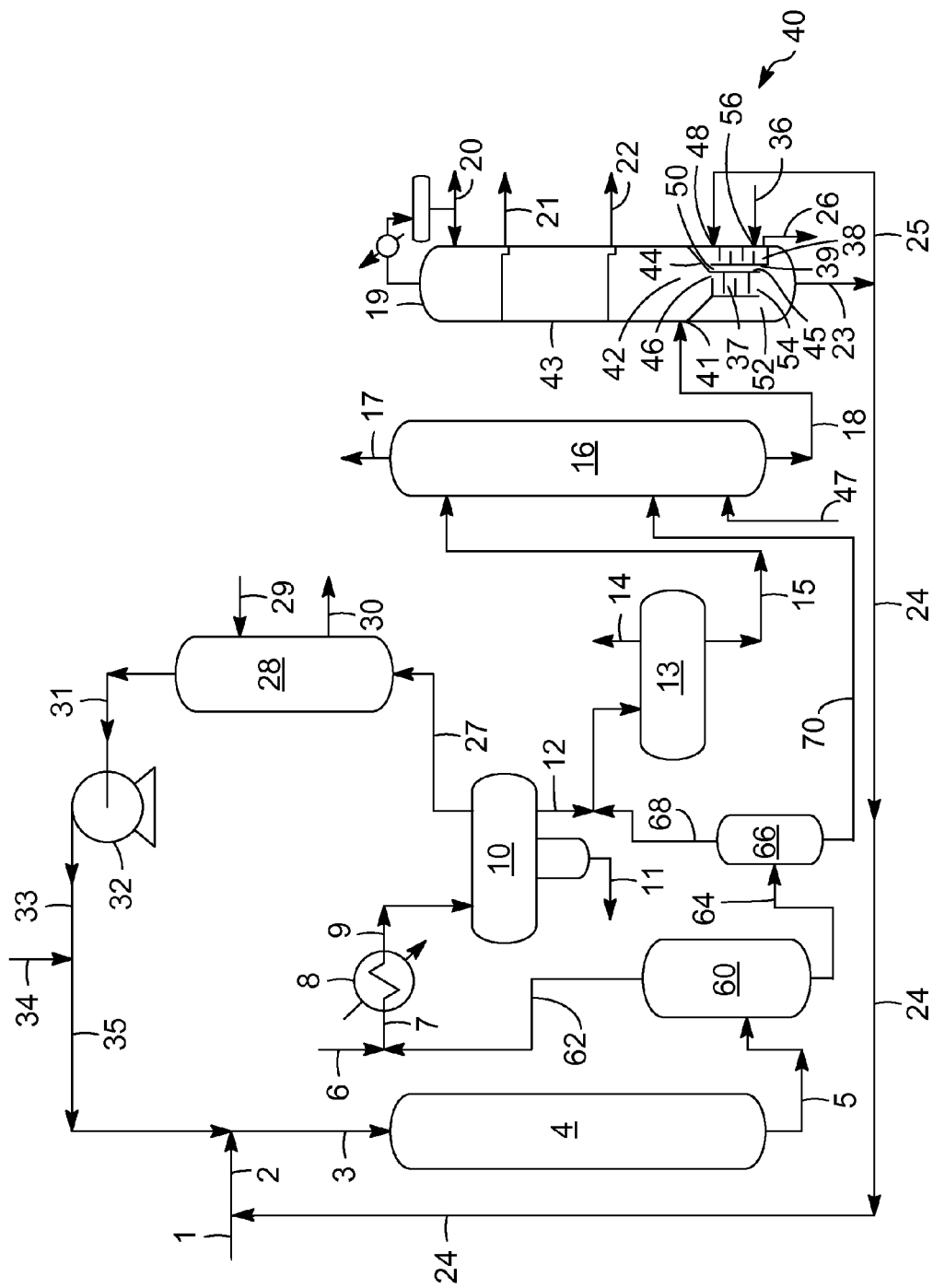
FIG. 1 is a schematic process flow diagram of an embodiment of the present invention.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "column" means a distillation column or columns for separating one or more components of different volatilities which may have a reboiler on its bottom and a condenser on its overhead. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Stripper columns only have a condenser in the overhead and typically no reboiler. Instead a stripping gas such as steam strips vapors from the column bottoms. Feeds to the columns may be preheated. The top pressure is the pressure of the overhead vapor at the outlet of the column. The bottom temperature is the liquid bottom outlet temperature. Overhead lines and bottoms lines refer to the net lines from the column downstream of the reflux or reboil to the column.

As used herein, the term "a component-rich stream" means a rich stream coming out of a vessel that has a greater concentration of the component than the feed to the vessel.

As used herein, the term "a component-lean stream" means a lean stream coming out of a vessel that has a smaller concentration of the component than the feed to the vessel.

As used herein, the term "boiling point temperature" means True Boiling Point (TBP) calculated by ASTM D-2892 unless the boiling point temperature is indicated to be calculated using another method such as ASTM D-86.

DETAILED DESCRIPTION OF THE INVENTION

We have found that the stripping vapor requirement for operation of the HPNA stripping section is comparable with the stripping steam requirements of the bottom stripping zone of the product fractionation column. Therefore, the method of this invention is to utilize the vapor from the HPNA stripping section as the stripping vapor for the bottom stripping zone of the product fractionation column, instead of using two different stripping steam inputs to the column. Instead of venting the vapors from the HPNA stripping section to the interior volume of the product fractionation column where the feed flashes, the vapors are routed to below the bottom stripping trays of the product fractionation column and can then serve as stripping medium for the bottom stripping zone of the product fractionation column. This greatly reduces the total stripping steam requirement for the column and minimizes the column diameter and size of the overhead condensing system. We have also unexpectedly found that the discovered arrangement improves separation efficiency in the column perhaps by increasing the liquid-to-vapor ratio above the feed inlet.

The process of the present invention is particularly useful for hydroprocessing a hydrocarbonaceous oil containing hydrocarbons and/or other organic materials to produce a product containing hydrocarbons and/or other organic materials of lower average boiling point and lower average molecular weight. The hydrocarbonaceous feedstocks that may be subjected to hydroprocessing by the method of the invention include all mineral oils and synthetic oils (e.g., shale oil, tar sand products, etc.) and fractions thereof. Illustrative hydrocarbonaceous feedstocks include those containing components boiling above 288° C. (550° F.), such as atmospheric gas oils, vacuum gas oils, deasphalted, vacuum, and atmospheric residua, hydrotreated or mildly hydrocracked residual oils, coker distillates, straight run distillates, solvent-deasphalted oils, pyrolysis-derived oils, high boiling synthetic oils, cycle oils and catalytic cracker distillates. A preferred hydrocracking feedstock is a gas oil or other hydrocarbon fraction having at least 50% by weight, and most usually at least 75% by weight, of its components boiling at temperatures above the end point of the desired product, which end point, in the case of heavy gasoline, is generally in the range from about 193° to about 216° C. (380° to 420° F.). One of the most preferred gas oil feedstocks will contain hydrocarbon components which boil above 288° C. (550° F.) with best results being achieved with feeds containing at least 25 percent by volume of the components boiling between 316° and 538° C. (600° and 1000° F.).

Also included are petroleum distillates wherein at least 90 percent of the components boil in the range from about 149° to about 427° C. (300° to 800° F.). The petroleum distillates may be treated to produce both light gasoline fractions with a boiling range, for example, from about 10° to about 85° C. (50° to 185° F.) and heavy gasoline fractions with a boiling range, for example, from about 85° to about 204° C. (185° to 400° F.).

In the drawings, the process of the present invention is illustrated by means of a simplified schematic flow diagram in which such details as pumps, instrumentation, heat-exchange and heat-recovery circuits, compressors and similar hardware have been deleted as being non-essential to an understanding of the techniques involved. The use of such miscellaneous equipment is well within the purview of one skilled in the art.

Reference will be made to FIG. 1 to describe a first embodiment of the present invention which is useful for delivering one hydroprocessed feed stream to a fractionation column for removing HPNA's. In this first embodiment, a hydrocarbon feed stream which may comprise vacuum gas oil (VGO) and heavy coker gas oil (HCGO) is introduced into the process via line 1 and admixed with a hereinafter described recycled liquid hydrocarbonaceous stream transported via line 24. The resulting admixture is carried via line 2 and admixed with a hydrogen-rich recycle gas transported via line 35. This resulting admixture is then transported via line 3 into a hydroprocessing reactor 4 and is contacted with a hydrotreating catalyst and hydrogen at hydrotreating reaction conditions to effect denitrification and desulfurization of the feed stream. Preferred hydrotreating reaction conditions include a temperature from about 204° to about 482° C. (400° to 900° F.), a pressure from about 3447 to about 17237 kPa (500 to 2500 psig), a liquid hourly space velocity of the fresh hydrocarbonaceous feedstock from about 0.1 hr$^{-1}$ to about 10 hr$^{-1}$ with a hydrotreating catalyst or a combination of hydrotreating catalysts.

The term "hydrotreating" as used herein refers to processes wherein a hydrogen-containing treat gas is used in the presence of suitable catalysts which are primarily active for the removal of heteroatoms, such as sulfur and nitrogen, and for some hydrogenation of aromatics. Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same reaction vessel. The Group VIII metal is typically present in an amount ranging from about 2 to about 20 wt-%, preferably from about 4 to about 12 wt-%. The Group VI metal will typically be present in an amount ranging from about 1 to about 25 wt-%, preferably from about 2 to about 25 wt-%. Typical hydrotreating temperatures range from about 204° to about 482° C. (400° to 900° F.) with pressures from about 3447 to about 17237 kPa (500 to 2500 psig), preferably from about 3447 to about 13790 kPa (500 to 2000 psig).

In one embodiment of the present invention the resulting effluent from the hydrotreating reaction zone is then introduced into a hydrocracking reaction zone which may also be contained in the hydroprocessing reactor 4. The hydrocracking zone may contain one or more beds of the same or different catalyst. In one embodiment, when the preferred products are middle distillates, the preferred hydrocracking catalysts utilize amorphous bases or low-level zeolite bases combined with one or more Group VIII or Group VIB metal hydrogenating components. In another embodiment, when the preferred products are in the gasoline boiling range, the hydrocracking zone contains a catalyst which comprises, in general, any crystalline zeolite cracking base upon which is deposited a minor proportion of a Group VIII metal hydrogenating component. Additional hydrogenating components may be selected from Group VIB for incorporation with the zeolite base. The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and 14 Angstroms ($10^{-10}$ meters). It is preferred to employ zeolites having a relatively high silica/alumina mole ratio between about 3 and 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms ($10^{-10}$ meters), wherein the silica/alumina mole ratio is about 4 to 6. A prime example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. The preferred cracking bases are those which are at least about 10 percent, and preferably at least 20 percent, metal-cation-deficient, based on the initial ion-exchange capacity. Specifically desirable and stable classes of zeolites are those wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and 30 percent by weight may be used. In the case of the noble metals, it is normally preferred to use about 0.05 to about 2 wt-%. The preferred method for incorporating the hydrogenating metal is to contact the zeolite base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., 371° to 649° C. (700° to 1200° F.) in order to activate the catalyst and decompose ammonium ions. Alternatively, the zeolite component may first be pelleted, followed by the addition of the hydrogenating component and activation by calcining. The foregoing catalysts may be employed in undiluted form, or the powdered zeolite catalyst may be mixed and copelleted with other relatively less active catalysts, diluents or binders such as alumina, silica gel, silica-alumina cogels, activated clays and the like in proportions ranging between 5 and 90 wt-%. These diluents may be employed as such or they may contain a minor proportion of an added hydrogenating metal such as a Group VIB and/or Group VIII metal.

Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

The hydrocracking of the hydrocarbonaceous feedstock in contact with a hydrocracking catalyst is conducted in the presence of hydrogen and preferably at hydrocracking reactor conditions which include a temperature from about 450° F.

(232° C.) to about 875° F. (468° C.), a pressure from about 3447 to about 20684 kPa gauge (500 to 3000 psig), a liquid hourly space velocity (LHSV) from about 0.1 to about 30 hr$^{-1}$, and a hydrogen circulation rate from about 337 to about 4200 normal m$^3$/m$^3$ (2000 to 25,000 standard cubic feet per barrel). In accordance with the present invention, the term "substantial conversion to lower boiling products" is meant to connote the conversion of at least 5 vol-% of the fresh feedstock. In a preferred embodiment, the per pass conversion in the hydrocracking zone is in the range from about 15% to about 60%.

The resulting effluent from the hydroprocessing reactor 4 is carried in line 5 and introduced to a hot separator 60. The hot separator is operated at about the temperature and pressure of the hydroprocessing reactor 4. A vaporous stream comprising hydrocarbons and lighter gases exits the hot separator 60 in line 62 and a liquid hydrocarbonaceous stream exits in line 64. The liquid hydrocarbonaceous stream in line 64 enters into a hot flash drum 66 which is operated at about the same temperature but at a lower pressure than the hot separator 60. The hot flash drum operates in the range of about 724 to about 3516 kPa (gauge) (105 to 510 psig). A vaporous stream leaves the hot flash drum 66 in line 68 and admixes with a liquid hydrocarbonaceous stream in line 12 from a cold separator 10. A liquid hydrocarbonaceous stream exits the hot flash drum 66 in line 70 and is fed to a stripper column 16.

The vaporous stream in line 62 is admixed with an aqueous stream introduced in line 6. The resulting admixture is transported via line 7 and introduced into heat-exchanger 8 and partially condensed. A resulting cooled effluent from heat-exchanger 8 is transported via line 9 and introduced into the cold separator 10. The cold separator is operated at a pressure substantially equal to the hydroprocessing reactor 4 and a temperature in the range from about 38° to about 71° C. (100° to 160° F.).

A hydrogen-rich gaseous stream containing hydrogen sulfide is removed from vapor-liquid separator 10 via line 27 and introduced into gas recovery zone 28. A lean solvent is introduced via line 29 into acid gas recovery zone 28 and contacts the hydrogen-rich gaseous stream in order to adsorb an acid gas. A rich solvent containing acid gas is removed from acid gas recovery zone 28 via line 30 and recovered. A hydrogen-rich gaseous stream containing a reduced concentration of acid gas is removed from acid gas recovery zone 28 via line 31 and compressed in compressor 32. A compressed hydrogen-rich gaseous recycle stream is transported via line 33 and is admixed with a make-up hydrogen gaseous stream carried via line 34 and the resulting admixture is transported via line 35 and is admixed with the admixture of the fresh feedstock and the recycled liquid hydrocarbonaceous stream in line 2 to provide at least a portion of the hydrogen introduced into the hydroprocessing reactor 4 as hereinabove described. In a preferred embodiment, the hydrogen-rich gaseous stream introduced into the hydroprocessing reactor 4 via line 35 contains less than about 100 wppm hydrogen sulfide.

An aqueous stream is removed from the boot in line 11. A liquid hydrocarbonaceous stream is recovered from the cold separator 10 via line 12 and is passed to a cold flash drum 13 having a lower pressure to produce a gaseous stream containing hydrogen and normally gaseous hydrocarbons via line 14 and recovered. The cold flash drum operates in about the temperature range of the cold separator 10 and in a pressure range of about 700 to about 3500 kPa (gauge) (100 to 500 psig). A liquid hydrocarbonaceous stream is removed from cold flash drum 13 via line 15 and introduced into the stripper column 16 at a feed inlet above a feed inlet for line 70. A stripping vapor such as steam is provided via line 47 and introduced into a bottom of the stripper column 16 at a feed inlet below the feed inlet for line 70. The stripper column 16 produces an overhead stream containing normally gaseous hydrocarbons transported via line 17. The overhead of the stripper column may have a condenser and reflux, with the net overhead stream provided in line 17. A liquid hydrocarbonaceous stream containing trace quantities of HPNA compounds is removed from a bottom of the stripper column 16 via line 18 and introduced into a fractionation column 19 as a first hydroprocessed stream. The fractionation column 19 is in downstream communication with the hydroprocessing reactor 4. The stripper column 16 may be operated at a top pressure of about 700 to about 1000 kPa (gauge) (100-150 psig) and a bottom temperature of about 232 to about 260° C. (450-500° F.).

In accordance with the present invention, the fractionation column 19 accepts the heated first hydroprocessed feed stream in line 18 containing hydrocarbons boiling at a temperature above, below and in the boiling range of the hydrocarbonaceous feedstock including HPNA compounds. The first hydroprocessed feed stream in line 18 enters the fractionation column 19 through feed inlet 41 and enters an interior volume 42 of the column 19 where it flashes to vapor and liquid. A naphtha boiling range hydrocarbon stream is removed from the overhead of the fractionation column 19 and condensed. A portion of the condensed stream may be refluxed to a top of the column 19 and condensed naphtha may be recovered in net overhead stream via line 20. A kerosene boiling range hydrocarbonaceous stream may be removed from fractionation column 19 via line 21 and recovered. A diesel boiling range hydrocarbonaceous stream may be removed from fractionation column 19 via line 22 and recovered. The fractionation column 19 may be operated with a top pressure of about 35 to about 100 kPa (gauge) (5 to 15 psig) and a bottom temperature of about 315° to about 360° C. (600° to 680° F.).

The fractionation column 19 has a split shell configuration 40 comprising a first compartment 37 and a second compartment 38 in a bottom of the column, preferably in the lower third of the column. The first compartment 37 is in downstream communication with the first feed inlet 41 to the fractionation column 19. The first compartment 37 may comprise one or more outer walls such as an outer cylindrical wall 45. The first compartment 37 may extend upwardly in the fractionation column 19 above the lower end of the column. In an aspect, the first compartment 37 may include at least a portion of the interior volume 42. The second compartment 38 is isolated from the interior volume 42 of the column above the second compartment. In an embodiment of FIG. 1, an annular baffle 44 occludes communication between the second compartment 38 and the volume 42 of the column above the baffle 44. The baffle 44 extends across an entire vertical projection of the top of the second compartment 38 to prevent vapor from ascending from the second compartment directly into the interior volume 42 above the baffle 44. The vertical projection of the top of the second compartment 38 may be defined by an adjacent inner surface of a wall of the column 19 and a wall 39 of the second compartment.

An opening 46 allows communication between the first compartment 37 and the interior volume 42. The baffle 44 may be an annular baffle that circumferences the opening 46 and may also have an inverted frustoconical configuration. When the first hydroprocessed feed stream in line 18 enters the interior volume 42 of the fractionation column 19, it flashes and heavier materials descend through opening 46 into the first compartment 37. The descending heavier materials are contacted by stripping vapor ascending counter currently against the heavier materials. The stripping vapor strips lighter materials from the heavier materials and the stripping vapor and lighter materials exit the opening 46 into the interior volume 42 above the first compartment 37 to undergo further fractionation.

At least a portion of the stripped first hydroprocessed stream comprising hydrocarbons boiling in the range of the hydrocarbonaceous feedstock and HPNA compounds exit from the first compartment 37 through an outlet 54 in a lower end of the first compartment 37 and enter a lower volume 52 in the lower end of the fractionation column 19. The lower volume 52 is in the bottom of the fractionation column 19 not occupied by the first compartment 37 or the second compartment 38. The bottoms liquid hydrocarbonaceous stream containing hydrocarbons boiling in the range of the hydrocarbonaceous feedstock and HPNA compounds exit the bottom of the fractionation column 19 in bottoms line 23. At least a portion of the bottoms liquid hydrocarbonaceous stream containing hydrocarbonaceous compounds boiling in and above the range of the hydrocarbonaceous feedstock including HPNA compounds is recycled to the hydroprocessing reactor 4 via line 24 as described hereinabove.

In the embodiment of FIG. 1, another portion of the bottoms liquid hydrocarbonaceous stream comprising stripped first hydroprocessed stream boiling in the range of the hydrocarbonaceous feedstock and HPNA compounds is introduced in line 25 to the second compartment 38 located in the bottom of the fractionation column 19 as a second hydroprocessed feed stream through a second feed inlet 48. The second feed inlet 48 is in downstream communication with the outlet 54 in the first compartment 37. The second feed inlet 48 is disposed below the baffle 44. The first feed inlet 41 to the column 19 is for a lighter hydroprocessed stream in line 18, and the second feed inlet 48 to the column 19 is for a heavier hydroprocessed stream in line 25. In other words, the second hydroprocessed stream in line 25 is heavier than the first hydroprocesses stream in line 18.

The second compartment 38 is in downstream communication with the second feed inlet 48. A stripping vapor is fed to a lower end of the second compartment through stripping inlet 56 via line 36 to counter currently contact the second hydroprocessed stream fed into inlet 48 near an upper end of the second compartment 38. Consequently, the stripping inlet 56 is disposed below the second feed inlet 48. The stripping vapor, which may be steam, strips lighter hydrocarbons boiling in the range of the hydrocarbonaceous feedstock from the second hydroprocessed stream fed from line 25 to produce a stripped hydroprocessed bottoms stream concentrated in HPNA compounds in line 26. Line 26 exits from the lower end of the second compartment 38 below the stripping inlet 56 and is recovered. The stripped hydroprocessed bottoms stream in line 26 has a greater concentration of HPNA's than the second hydroprocessed stream 25 fed to the second compartment 38. It is suitable that the heavy bottoms stream rich in HPNA compounds in line 26 has a flow rate less than about 1 vol-% of the flow rate of the hydrocarbonaceous feedstock. The stripping vapor becomes enriched in lighter hydrocarbons to provide an enriched stripping vapor stream.

The second chamber 38 has closed lower end to prevent materials from passing below the second chamber. The enriched stripping vapor enriched with lighter hydrocarbons is withdrawn from the second compartment 38. In the embodiment of FIG. 1, the enriched stripping vapor passes from an upper end of the second compartment 38 downwardly through a passage 50 which directs stripping vapor enriched with lighter hydrocarbons from an upper end of the second compartment 38 to a lower end of the first compartment 37. In the embodiment of FIG. 1, the passage 50 is an internal vapor passage that may be at least partially defined by the baffle 44. The passage 50 may also be at least partially defined by each or both of opposing walls of the first chamber 37 and the second chamber 38. The baffle 44 directs ascending enriched vapor downwardly to enter the lower volume 52.

We have found that the enriched vapor from the second compartment 38 may be used as the stripping vapor for the first compartment 37. The embodiment of FIG. 1 has a split-shell configuration 40 that transports enriched vapor from the second compartment 38 to the first compartment 37 internally. The lower end of the first compartment may be open to allow enriched vapor from the lower volume 52 to ascend into the first compartment 37 through the lower end and strip light materials from the heavier portions of the first hydroprocessed stream in the first compartment 37. The wall 45 of the first compartment 37 and the wall 39 of the second compartment 38 limit unintended lateral movement between compartments. Trays may also be provided in the compartments to facilitate stripping.

It is envisioned that the stripping vapor may be fed first to the first compartment 37 and at least a portion of the stripping vapor from the first compartment 37 be passed to the second compartment 38.

The hydroprocessing process in reactor 4 may be performed without a hydrotreating reaction zone and with one or more hydrocracking zones as long as at least a portion of an effluent from the hydroprocessing reactor 4 is introduced into the fractionation column 19.

Figure 2:
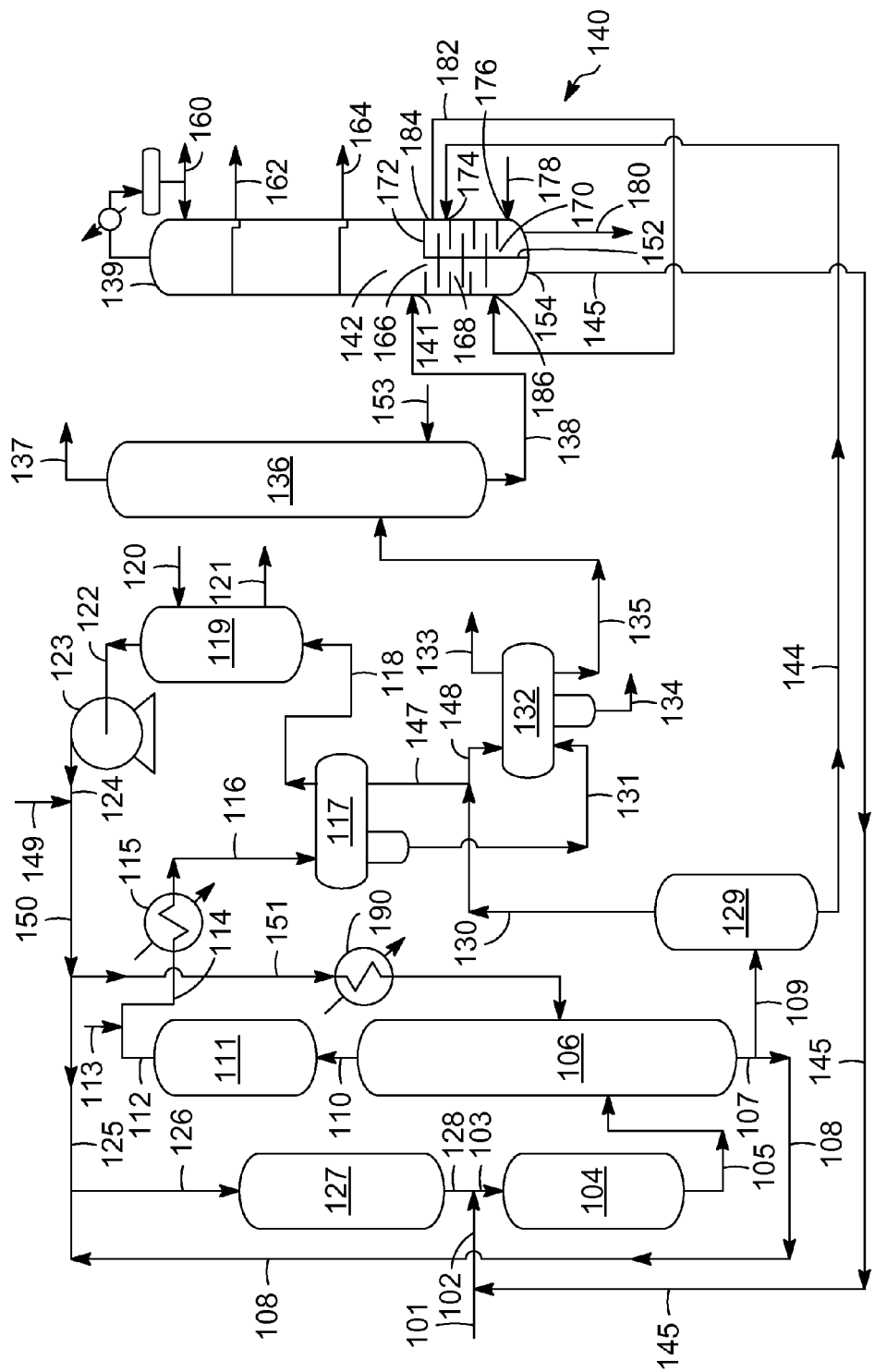
FIG. 2 is a schematic process flow diagram of an alternative embodiment of the present invention.

Reference will be made to FIG. 2 to describe a second embodiment of the present invention which is useful for delivering two hydroprocessed feed streams to a fractionation column for removing HPNA's. In this second embodiment, a feed stock selected from the group of hydrocarbon streams described for the first embodiment, such as VGO and HCGO, is introduced into the process via line 101. However, a preferred hydrocarbonaceous feedstock for this embodiment boils in the range from about 232° to about 566° C. (450° to 1050° F.). The feedstock in line 101 is admixed with a hereinafter-described recycle stream provided via line 145 and the resulting admixture is transported via line 102 and is admixed with a hereinafter-described effluent from hydrocracking reactor 127 transported via line 128. The resulting admixture is transported via line 103 into a first hydroprocessing reactor comprising a hydrotreating reactor 104 to effect denitrification and desulfurization of the feed stock. Preferred hydrotreating reaction conditions are as described for the hydrotreating reactor in FIG. 1.

The resulting effluent from the first hydroprocessing reactor comprising a hydrotreating reactor 104 is transferred perhaps with cooling in line 105 and is introduced into a hot, high pressure stripper 106 maintained at essentially the same pressure as the hydrotreating reactor 104. The hydrotreated effluent from line 105 is contacted and stripped counter-currently with a hydrogen-rich gaseous stream introduced by line 151 to produce a first gaseous hydrocarbonaceous stream containing hydrocarbonaceous compounds boiling at a temperature less than about 371° C. (700° F.), hydrogen sulfide and ammonia in line 110. A first liquid hydrocarbonaceous stream containing hydrocarbonaceous compounds boiling at a temperature greater than about 371° C. (700° F.) is produced from stripper 106 in line 107. The stripper is preferably maintained at a temperature in the range from about 232° to about 468° C. (450° to 875° F.). It is preferred that any cooling of the hydrotreated effluent prior to stripping is less than about 56° C. (100° F.). By maintaining the pressure of the stripper 106 at essentially the same pressure as the hydrotreating reactor 104 is meant that any difference in pressure is due to the pressure drop required to flow the effluent stream from the reactor to the stripper. It is preferred that the pressure drop be less than about 689 kPa (100 psig).

At least a portion of the first liquid hydrocarbonaceous stream in line 107 containing hydrocarbonaceous compounds boiling in the range of the hydrocarbon feedstock at a temperature greater than about 371° C. (700° F.) is removed from stripper 106 via line 107 and a portion is transported via line 108 and line 126 and is introduced into a second hydroprocessing reactor comprising a hydrocracking reactor 127 and another portion is transported via line 109 and introduced into hot flash separator 129. Hydrogen is added to the hydrocracking reactor via lines 125 and 126. The second hydroprocessing reactor comprising a hydrocracking reactor 127 may be operated with conditions and catalyst specified with respect to the embodiment of FIG. 1. However, in a suitable embodiment, the per pass conversion in the hydrocracking reactor 127 is in the range from about 15% to about 65% to effect mild hydrocracking conditions. More preferably, the conversion per pass is in the range from about 20% to about 40%.

The resulting first gaseous hydrocarbonaceous stream in line 110 containing hydrocarbonaceous compounds boiling at a temperature less than about 371° C. (700° F.), hydrogen, hydrogen sulfide and ammonia from the stripper 106 is preferably introduced in an all vapor phase into a post-treat hydrogenation reactor 111 to hydrogenate at least a portion of the aromatic compounds in order to improve the quality of the middle distillate, particularly the jet and diesel fuel quality. The post-treat hydrogenation reactor 111 may be conducted in a downflow, upflow or radial flow mode of operation and may utilize any known hydrogenation catalyst.

A resulting effluent from the post-treat hydrogenation reactor 111 is transported via line 112, admixed with a water wash stream introduced by line 113 and introduced into heat-exchanger 115 via line 114. The effluent in line 112 is preferably cooled to a temperature in the range from about 4° to about 80° C. (40° to 176° F.) and at least partially condensed before it is introduced into a vapor-liquid separator 117 via line 116. A hydrogen-rich gaseous stream is removed from the vapor-liquid separator 117 via line 118 and introduced into acid gas recovery zone 119 to produce a second hydrogen-rich gaseous stream.

A lean solvent is introduced via line 120 into acid gas recovery zone 119 and contacts the hydrogen-rich gaseous stream in order to dissolve acid gas. A rich solvent containing acid gas is removed from acid gas recovery zone 119 via line 121 and recovered. A hydrogen-rich gaseous stream containing a reduced concentration of acid gas is removed from acid gas recovery zone 119 via line 122, compressed in compressor 123, transported via line 124 and admixed with fresh make-up hydrogen which is introduced via line 149. Fresh make-up hydrogen may be introduced into the process at any suitable and convenient location.

The resulting admixture is transported via line 150 and is bifurcated to provide at least a portion of the first hydrogen-rich gaseous stream in line 151. The first hydrogen-rich gaseous stream in line 151 is heated in heat exchanger 190 and introduced into the stripper 106. At least another portion of the resulting admixture in line 150 is a second hydrogen-rich gaseous stream in line 125 introduced into the hydrocracking reactor 127 as hereinabove described. Before the second hydrogen-rich gaseous stream is introduced into the hydrocracking reactor, it is preferred that at least a significant portion, at least about 90 wt-%, for example, of the hydrogen sulfide is removed and recovered by means of known, conventional methods. In an embodiment, the hydrogen-rich gaseous stream introduced into the hydrocracking reactor 127 contains less than about 100 wppm hydrogen sulfide.

An aqueous stream containing dissolved salt compounds is removed from vapor-liquid separator 117 via line 131 and introduced into cold flash separator 132. A liquid hydrocarbonaceous stream is removed from vapor-liquid separator 117 via line 147 and is admixed with a gaseous stream provided via line 130 and the resulting admixture is transported via line 148 and introduced into cold flash separator 132 to produce a second liquid hydrocarbonaceous stream in line 135 which is recovered and fractionated to produce desired hydrocarbon product streams. A gaseous stream is removed from cold flash separator 132 via line 133 and recovered. An aqueous stream containing dissolved salt compounds is removed from cold flash separator 132 via line 134 and recovered.

The second liquid hydrocarbonaceous stream is removed from cold flash separator 132 via line 135 and introduced into a stripper column 136. Stripping vapor such as steam is provided via line 153 and introduced into stripper column 136 to produce an overhead stream containing normally gaseous hydrocarbons and transported via line 137. The overhead of the stripper column may have a condenser and reflux, with the net overhead stream provided in line 137. A liquid hydrocarbonaceous stream is removed from a bottom of the stripper column 136 via line 138 and introduced into a fractionation column 139 as a first hydroprocessed stream. The stripper column 136 is operated at a top pressure of about 700 to about 1000 kPa (gauge) (100 to 150 psig) and a bottom temperature of about 232 to about 260° C. (450 to 500° F.).

A portion of the first hydrocarbonaceous liquid stream in line 109 introduced to the hot flash separator 129 produces a vapor stream in line 130 and is introduced into the cold flash separator 132 via line 148. A liquid hydrocarbonaceous stream is removed from the hot flash separator 129 containing hydrocarbons boiling in the range of the hydrocarbonaceous feedstock and boiling in a range higher than the hydrocarbonaceous feedstock via line 144 and transported and introduced into a second compartment of the fractionation column 139 as a second hydroprocessed feed.

FIG. 2 illustrates fractionation column 139 having a split shell configuration 140 that has an external vapor passage. This split shell configuration 140 with an external vapor passage can be used in conjunction with the embodiment of FIG. 1, as well, with only one external hydrocarbon feed to the fractionation column. Moreover, the configuration of FIG. 1 with an internal vapor passage can be used in conjunction with the embodiment of FIG. 2.

In accordance with the present invention, the fractionation column 139 accepts the heated first hydroprocessed feed stream in line 138 containing hydrocarbons boiling in the range of the hydrocarbonaceous feedstock and boiling in a range lower than the hydrocarbonaceous feedstock. The first hydroprocessed feed stream in line 138 enters the fractionation column 139 through feed inlet 141 and enters an interior volume 142 of the column 139. A naphtha boiling range hydrocarbon stream is removed from the overhead of the fractionation column 139 and condensed. A portion of the condensed stream may be refluxed to a top of the column 139 and condensed naphtha may be recovered in net overhead stream via line 160. A kerosene boiling range hydrocarbonaceous stream may be removed from fractionation column 139 via line 162 and recovered. A diesel boiling range hydrocarbonaceous stream may be removed from fractionation column 139 via line 164 and recovered. The fractionation column 139 may operate with a top pressure of about 35 to about 100 kPa (gauge) (5-15 psig) and a bottom temperature of about 315 to about 360° C. (600-680° F.).

The fractionation column 139 has a first compartment 168 and a second compartment 170 in a bottom of the column, preferably in the lower third of the column. The first compartment 168 is in downstream communication the first feed inlet 141 to the fractionation column 139. The first compartment 168 may extend into the fractionation column 139 above the bottom of the column. In an aspect, the first compartment 168 may include at least a portion of the interior volume 142. The second compartment 170 is isolated from the interior volume 142 of the column above the second compartment. In an embodiment of FIG. 2, a wall 152 prevents fluid from flowing laterally between the first compartment 168 and the second compartment. Also in the embodiment of FIG. 2, a baffle 172 occludes communication between the second compartment 170 and the interior volume 142 of the column above the baffle 172. The baffle 172 extends across an entire vertical projection of the top of the second compartment 170 to prevent vapor from ascending from the second compartment directly into the interior volume 142 above the baffle 172. The vertical projection of the top of the second compartment 170 is defined by an adjacent surface of a wall of the column 139 and the wall 152.

An opening 166 allows communication between the first compartment 168 and the interior volume 142. The baffle 172 may border the opening 166 and may also have a flat or an inclined configuration. When the first hydroprocessed feed stream in line 138 enters the fractionation column 139 it flashes in the interior volume 142 and heavier materials descend through opening 166 in the first compartment 168. The descending heavier materials are contacted by stripping vapor ascending counter currently against the heavier materials. The stripping vapor strips lighter materials from the heavier materials and the stripping vapor and lighter materials exit the opening 166 into the interior volume 142 above the first compartment 168. At least a portion of the stripped first hydroprocessed stream comprising hydrocarbons boiling in the range of the hydrocarbonaceous feedstock exit from the first compartment 168 through an outlet 154 in a lower end of the first compartment 168 which may be the bottoms exit from the fractionation column 139. At least a portion and preferably all of the bottoms liquid hydrocarbonaceous stream containing hydrocarbonaceous compounds boiling in the range of the hydrocarbonaceous feedstock is recycled to the first hydroprocessing reactor 104 via line 145 as described hereinabove.

In the embodiment of FIG. 2, a second hydroprocessed feed stream in line 144 comprising the liquid hydrocarbonaceous stream removed from the hot flash separator 129 is introduced into the second compartment 170 located in the bottom of the fractionation column 139 through a second feed inlet 174. The second hydroprocessed feed stream in line 144 comprises hydrocarbons boiling in the range of the hydrocarbonaceous feedstock and boiling in a range greater than the hydrocarbonaceous feedstock including HPNA compounds. The second feed inlet 174 is disposed below the baffle 172. The first feed inlet 141 to the column 139 is for a lighter hydroprocessed stream in line 138, and the second feed inlet 174 to the column 139 is for a heavier hydroprocessed stream in line 144. In other words, the second hydroprocessed stream in line 144 is heavier than the first hydroprocessed stream in line 138.

The second compartment 170 is in downstream communication with the second feed inlet 174. A stripping vapor is fed to a lower end of the second compartment 170 through stripping vapor inlet 176 via line 178 to counter currently contact the second hydroprocessed stream fed into inlet 174 near an upper end of the second compartment 170. Consequently, the stripping vapor inlet 176 is disposed below the second feed inlet 174. The stripping vapor, which may be steam, strips lighter hydrocarbons boiling in the range of the hydrocarbonaceous feedstock from the second hydroprocessed stream fed from line 144 to produce a stripped hydroprocessed bottoms stream concentrated in HPNA compounds in line 180. Line 180 exits from the lower end of the second compartment 170 below the stripping inlet 176 and is recovered. The stripped hydroprocessed bottoms stream in line 180 has a greater concentration of HPNA's than the second hydroprocessed stream 144 fed to the second compartment 170. It is suitable that the heavy bottoms stream rich in HPNA compounds in line 180 has a flow rate less than about 1 wt-% of the flow rate of the hydrocarbonaceous feedstock.

The stripping vapor becomes enriched in lighter hydrocarbons to provide an enriched stripping vapor stream. The second chamber 170 has closed lower end to prevent materials from passing below the second chamber but through the outlet to line 180. The baffle 172 prevents enriched stripping vapor from exiting the top of the second compartment 170. The enriched stripping vapor enriched with lighter hydrocarbons is withdrawn from the second compartment 170 in a line or a conduit 182. In the embodiment of FIG. 2, the enriched stripping vapor passes from an upper end of the second compartment 170 downwardly through a passage 184 which directs stripping vapor enriched with lighter hydrocarbons from an upper end of the second compartment 170 to a lower end of the first compartment 168. In the embodiment of FIG. 2, the passage 184 is an external passage defined by the conduit 182. The passage 184 is disposed above the inlet 174 for the second hydroprocessed stream in line 144 and the stripping vapor inlet 176.

We have found that the enriched vapor from the second compartment 170 may be used as the stripping vapor for the first compartment 168. Enriched vapor from the passage 184 enters through an inlet 186 from the line 182 to the first compartment 168 and ascends to strip light materials from the heavier portions of the first hydroprocessed stream in the first compartment 168. Trays may be provided in the compartments to facilitate stripping.

The split shell fractionation column 139 is preferably constructed with a solid dividing wall 152 located in the lower end of the fractionation zone to partition the lower end to provide and maintain two separate compartments. Since the liquid volumetric flow rates are expected to be unequal in the two zones, it may be preferred that the second compartment 170 having the lower flow rate be sized proportionally smaller than the first compartment 168 in order to efficiently utilize the total volume available in the lower end of the fractionation column 139.

The heated feed to the fractionation column 139 may be introduced at any convenient place or elevation including either above or below the upper end of the dividing wall 152 in order to effect the desired fractionation and product generation. It is envisioned that the stripping vapor may be fed first to the first compartment 168 and at least a portion of the stripping vapor from the first compartment 168 be passed to the second compartment 170.

EXAMPLE

Simulations were run to compare the process of the present invention having a single vapor feed to the fractionation column bottoms with that of U.S. Pat. No. 6,379,535 which feeds steam separately to both compartments in the fractionation column bottoms. Distillation temperatures and steam requirements are shown for the base case and the inventive case.

Base Case (U.S. Pat. No. 6,379,535)
Total steam requirement: 106,501 kg/hr, 234,794 lb/hr
Condenser duty: 634,511 MJ/hr, 601,380,000 BTU/hr
Distillation Cuts per ASTM D-86

TABLE 1

| Volume % | Diesel Production °C., °F. | Fractionator Bottoms °C., °F. |
|---|---|---|
| 0 | 249, 481 | 355, 671 |
| 5 | 276, 529 | 383, 721 |
| 10 | 287, 549 | 394, 741 |
| 30 | 304, 579 | 409, 769 |
| 50 | 320, 608 | 426, 799 |
| 70 | 334, 634 | 444, 832 |
| 90 | 352, 666 | 473, 883 |
| 95 | 365, 689 | 494, 922 |
| 100 | 375, 707 | 516, 961 |

5/95 Gap = T5 (Fractionator Bottoms) − T95 (Diesel Product) = 383 − 365 = 18° C.

Inventive Case
Total steam requirement: 60,627 kg/hr, 133,660 lb/hr
Condenser duty: 525,471 MJ/hr, 498,050,000 BTU/hr
Distillation cuts per ASTM D-86

TABLE 2

| Volume % | Diesel Product °C., °F. | Fractionator Bottoms °C., °F. |
|---|---|---|
| 0 | 249, 481 | 362, 684 |
| 5 | 276, 529 | 385, 725 |
| 10 | 287, 549 | 394, 742 |
| 30 | 304, 579 | 409, 769 |
| 50 | 319, 607 | 426, 799 |
| 70 | 333, 632 | 444, 832 |
| 90 | 349, 661 | 473, 883 |
| 95 | 360, 680 | 494, 922 |
| 100 | 371, 699 | 516, 961 |

5/95 Gap = T5 (Fractionator Bottoms) − T95 (Diesel Product) = 385 − 360 = 25° C.

By means of the proposed invention, the stripping steam rate of the Inventive Case is less than 60% of the Base Case. Moreover, the overhead condenser duty is reduced by about 25%. Energy requirements are significantly reduced while achieving equal or better product quality.

An important parameter of product quality is the temperature at which 95% of the volume of the diesel boils, also known as "T95". The invention provides a 5° C. (9° F.) improvement over the base case. The inventive case meets the Euro V specification of 360° C. (680° F.), but the Base Case does not meet this specification, even with a substantial increase in the steam rate to the fractionation column.

Another important parameter of product quality is the difference between the T5 temperature of the fractionator bottoms and the T95 temperature of the diesel product. "T5", as used here, is the temperature at which 5% of the volume of the fractionator bottoms boils. The 5/95 gap is the difference between the T5 distillation temperature of the fractionator bottoms and the T95 diesel temperature. The 5/95 gap is an indication of the separation between the diesel and the bottoms. As can be seen from the simulation data above, the 5/95 gap for the inventive case is 7° C. higher than for the base case, which indicates that the invention provides a superior separation between the diesel and fractionator bottoms.

The improvement of product quality while reducing condenser duty and steam rate was unexpected.

The invention claimed is:

1. A process for removing HPNA's from a hydroprocessed stream comprising:
   feeding the hydroprocessed stream comprising HPNA's to a second compartment in a fractionation column also having a first compartment;
   feeding a stripping vapor to the second compartment to strip lighter hydrocarbons from the hydroprocessed stream and provide a stripped hydroprocessed stream and an enriched stripping vapor;
   withdrawing the stripped hydroprocessed stream from the second compartment with a greater concentration of HPNA's than in the hydroprocessed stream fed to the second compartment;
   withdrawing the enriched stripping vapor enriched with lighter hydrocarbons from the second compartment; and
   passing the enriched stripping vapor exiting downwardly from the second compartment to the first compartment in the fractionation column.

2. The process of claim 1 further comprising feeding a first hydroprocessed stream to the fractionation column and the hydroprocessed stream of claim 1 is a second hydroprocessed stream.

3. The process of claim 2 wherein the first hydroprocessed stream is lighter than the second hydroprocessed stream.

4. The process of claim 2 further comprising fractionating the first hydroprocessed stream in the fractionation column and stripping lighter materials from heavier portions of the first hydroprocessed stream in the first compartment with enriched stripping vapor from the second compartment.

5. The process of claim 4 further comprising taking a stripped first hydroprocessed stream from the first compartment as the second hydroprocessed feed.

6. The process of claim 1 further comprising directing the vapor exiting from the second compartment downwardly to a lower end of the first compartment.

7. A process for fractionating a hydroprocessed stream comprising:
   feeding a first hydroprocessed stream to a fractionation column;
   stripping heavier portions of the first hydroprocessed stream in a first compartment of the fractionation column;
   feeding a second hydroprocessed stream to a second compartment of the fractionation column;
   feeding a stripping vapor to the second compartment to strip the second hydroprocessed stream of lighter hydrocarbons to provide a stripped hydroprocessed stream and an enriched stripping vapor stream;
   withdrawing the stripped hydroprocessed stream from the second compartment with a greater concentration of HPNA's than in the second hydroprocessed stream fed to the second compartment;
   withdrawing the enriched stripping vapor enriched with lighter hydrocarbons from the second compartment; and
   passing the enriched stripping vapor exiting downwardly from the second compartment to the first compartment for stripping lighter materials from heavier portions of the first hydroprocessed stream.

8. The process of claim 7 wherein the first hydroprocessed stream is lighter than the second hydroprocessed stream.

9. The process of claim 7 further comprising taking a stripped first hydroprocessed stream from the first compartment as the second hydroprocessed feed.

10. The process of claim 7 further comprising directing vapor exiting from the second compartment downwardly.

11. A process for hydroprocessing a hydrocarbon stream comprising:

contacting a hydrocarbon stream with hydrogen and hydroprocessing catalyst under hydroprocessing conditions to provide a hydroprocessed effluent;

separating the hydroprocessed effluent to provide a first hydroprocessed stream;

feeding the first hydroprocessed stream to a fractionation column having a first compartment and a second compartment;

feeding a second hydroprocessed stream comprising HPNA's to the second compartment;

feeding a stripping vapor to the second compartment to strip lighter hydrocarbons from the second hydroprocessed stream and provide a stripped hydroprocessed stream and an enriched stripping vapor;

withdrawing the stripped hydroprocessed stream from the second compartment with a greater concentration of HPNA's than in the hydroprocessed stream fed to the second compartment;

withdrawing the enriched stripping vapor enriched with lighter hydrocarbons from the second compartment; and passing the enriched stripping vapor exiting downwardly from the second compartment to a first compartment in the fractionation column.

12. The process of claim 11 further comprising separating the hydroprocessed effluent into a vapor stream that provides the first hydroprocessed stream and a liquid stream that provides the second hydroprocessed stream.

13. The process of claim 11 further comprising fractionating the first hydroprocessed stream in the fractionation column and stripping lighter materials from heavier portions of the first hydroprocessed stream in the first compartment with enriched stripping vapor from the second compartment.

14. The process of claim 13 further comprising taking stripped heavier portions of the first hydroprocessed stream from the first compartment as the second hydroprocessed feed.

15. The process of claim 11 further comprising directing the vapor exiting from the second compartment downwardly to a lower end of the first compartment.

16. The process of claim 1 wherein the stripping vapor comprises steam.

17. The process of claim 1 further comprising providing a baffle occluding communication between the second compartment and a volume of the fractionation column above the baffle.

18. The process of claim 1 wherein the second compartment has a closed lower end distinct from the fractionation column.

19. The process of claim 7 wherein the stripping vapor comprises steam.

20. The process of claim 11 wherein the stripping vapor comprises steam.

* * * * *